US012709182B2

(12) United States Patent
Kaldobsky et al.

(10) Patent No.: US 12,709,182 B2
(45) Date of Patent: Aug. 18, 2026

(54) HIGH-VOLTAGE VEHICLE SYSTEM

(71) Applicant: FORD GLOBAL TECHNOLOGIES, LLC, Dearborn, MI (US)

(72) Inventors: Tyler James-Ray Kaldobsky, Canton, MI (US); Jonathan Andrew Butcher, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 543 days.

(21) Appl. No.: 18/104,499

(22) Filed: Feb. 1, 2023

(65) Prior Publication Data

US 2024/0253519 A1 Aug. 1, 2024

(51) Int. Cl.
*B60L 58/10* (2019.01)
*B60L 50/60* (2019.01)
*B60R 16/023* (2006.01)
*B62D 65/10* (2006.01)

(52) U.S. Cl.
CPC ............... *B60L 58/10* (2019.02); *B60L 50/60* (2019.02); *B60R 16/023* (2013.01); *B62D 65/10* (2013.01)

(58) Field of Classification Search
CPC ........ B60L 58/10; B60L 50/60; B60R 16/023; B62D 65/10
USPC ............................................................ 701/22
See application file for complete search history.

(56) References Cited

U.S. PATENT DOCUMENTS 8,842,408 B2 9/2014 Tomohiro
2009/0073624 A1 3/2009 Scholer et al.
2015/0200497 A1* 7/2015 Basoukeas ................ B60L 3/04 439/131
2017/0113565 A1* 4/2017 Lin ......................... B60L 58/16
2018/0208079 A1* 7/2018 Noppakunkajorn .... B60L 3/003
2022/0216718 A1* 7/2022 Wang ...................... H02J 7/345
2022/0340026 A1* 10/2022 Prasad .................... B60L 53/20
2023/0322087 A1* 10/2023 Briggs ...................... B60L 3/04 307/139

FOREIGN PATENT DOCUMENTS

CN 205344543 U 6/2016
DE 102019205423 A1 * 10/2020 .............. B60L 50/60
DE 102020104193 A1 * 8/2021 ............ B60L 3/0046
WO WO-2020174053 A1 * 9/2020 .............. H02J 7/751

* cited by examiner

*Primary Examiner* — Fadey S. Jabr
*Assistant Examiner* — Ahmed Alkirsh
(74) *Attorney, Agent, or Firm* — David B. Kelley; Brooks Kushman P.C.

(57) ABSTRACT

A vehicle includes a high-voltage (HV) bus and a controller. The controller, during assembly of a control system including a plurality of HV devices to be installed in a predefined order such that one of the HV devices is installed before an other of the HV devices, and responsive to detecting presence of the other of the HV devices and absence of the one of the HV devices, disconnects a traction battery from the HV bus.

16 Claims, 3 Drawing Sheets

HIGH-VOLTAGE VEHICLE SYSTEM

TECHNICAL FIELD

The present disclosure generally relates to a high-voltage (HV) system for an electric vehicle. More specifically, the present disclosure relates to a HV system for monitoring and controlling vehicle components during an assembly process.

BACKGROUND

Electric vehicles are powered by a HV traction battery for propulsion. The traction battery may be installed onto the vehicle during an assembly process and may be activated to supply electric power to various components of the vehicle during the assembly process.

SUMMARY

A vehicle includes an in-vehicle communication network, a high-voltage (HV) bus, a traction battery selectively connected to the HV bus, a control system including a plurality of HV devices, and a controller. The controller is programmed to, during installation of the control system, responsive to detecting presence of one of the HV devices via one of the in-vehicle communication network or the HV bus, and detecting absence of the one of the HV devices via the other of the in-vehicle communication network or the HV bus, disconnect the traction battery from the HV bus, during operation of the vehicle, responsive to detecting presence of the one of the HV devices via one of the in-vehicle communication network or the HV bus, and detecting absence of the one of the HV devices via the other of the in-vehicle communication network or the HV bus, not disconnect the traction battery from the HV bus.

A method for controlling a vehicle during an assembly process having multiple stages in which a first high-voltage (HV) device is installed during a first of the stages and a second HV device is installed during a second of the stages after the first of the stages, the method includes responsive to detecting, via a controller, a traction battery has been installed, connecting via a contactor the traction battery to a high-voltage (HV) bus, and responsive to detecting, via the controller, presence of the second HV device during the first of the stages, disconnect the traction battery form the HV bus.

A vehicle includes a high-voltage (HV) bus and a controller. The controller is programmed to, during assembly of a control system including a plurality of HV devices to be installed in a predefined order such that one of the HV devices is installed before an other of the HV devices, and responsive to detecting presence of the other of the HV devices and absence of the one of the HV devices, disconnect a traction battery from the HV bus.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, proposes a system and method for operating an electric system of an electric vehicle during the vehicle assembly process.

Figure 1:
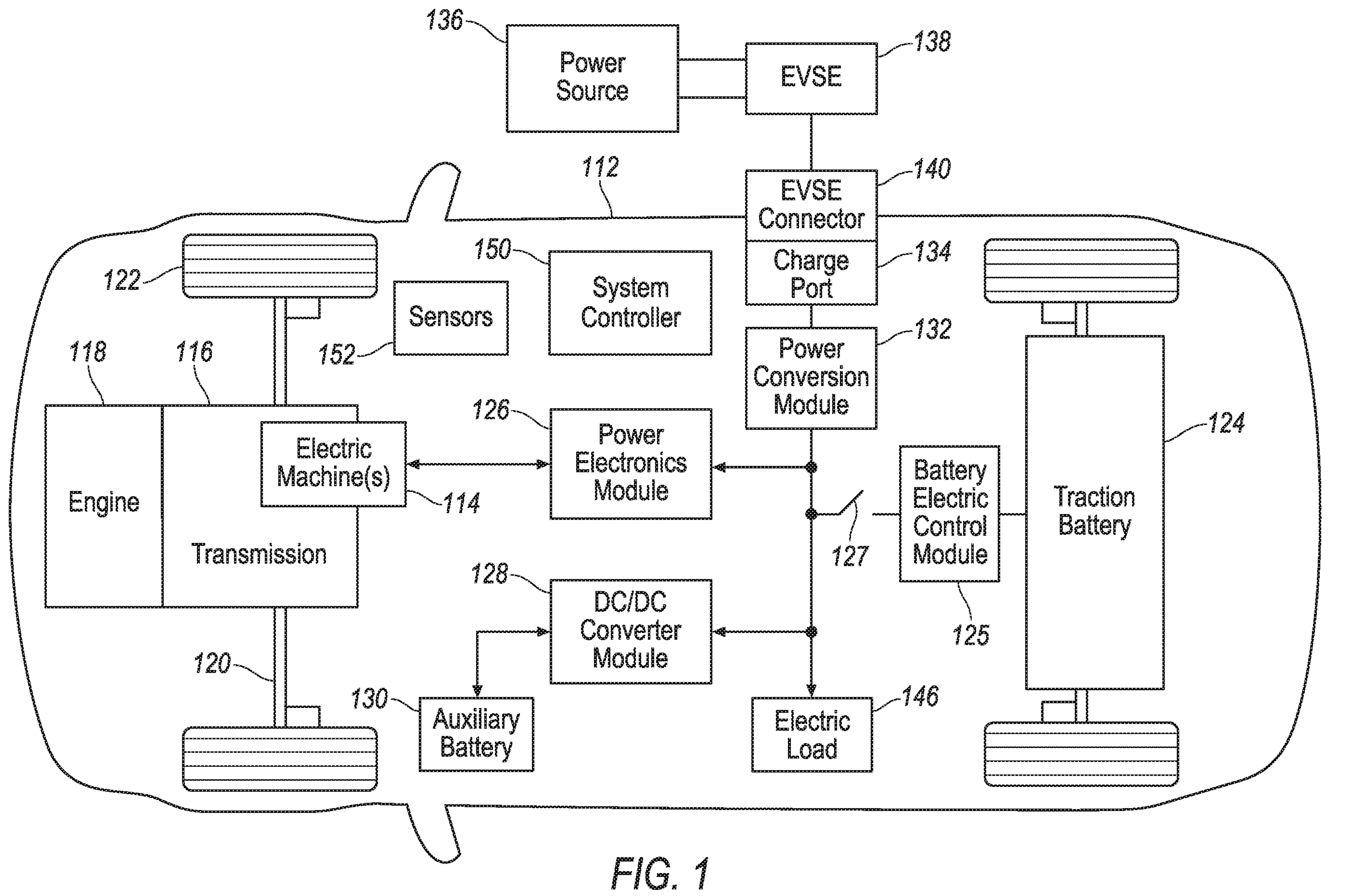
FIG. 1 illustrates an example block topology of an electrified vehicle illustrating drivetrain and energy storage components.

FIG. 1 illustrates a plug-in hybrid-electric vehicle (PHEV). A plug-in hybrid-electric vehicle 112 may comprise one or more electric machines (electric motors) 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The electric machines 114 may provide propulsion and braking capability when the engine 118 is turned on or off. The electric machines 114 may also act as generators and may provide fuel economy benefits by recovering energy that would be lost as heat in the friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 stores energy that may be used by the electric machines 114. A vehicle battery pack 124 may provide a high voltage (HV) DC output. The traction battery 124 may be electrically coupled to one or more battery electric control modules (BECM) 125. The BECM 125 may be provided with one or more processors and software applications configured to monitor and control various operations of the traction battery 124. The traction battery 124 may be further electrically coupled to one or more power electronics modules 126. The power electronics module 126 may also be referred to as a power inverter. One or more contactors 127 may isolate the traction battery 124 and the BECM 125 from other components when opened and couple the traction battery 124 and the BECM 125 to other components when closed. The power electronics module 126 may also be electrically coupled to the electric machines 114 and provide the ability to bi-directionally transfer energy between the traction battery 124 and the electric machines 114. For example, a traction battery 124 may provide a DC voltage while the electric machines 114 may operate using a three-phase AC current. The power electronics module 126 may convert the DC voltage to a three-phase AC current for use by the electric machines 114. In a regenerative mode, the power electronics module 126 may convert the three-phase AC current from the electric machines 114 acting as generators to the DC voltage compatible with the traction battery 124. The description herein is equally applicable to a pure electric vehicle. For a pure electric vehicle, the hybrid transmission 116 may be a gear box connected to the electric machine 114 and the engine 118 may not be present.

In addition to providing energy for propulsion, the traction battery 124 may provide energy for other vehicle electrical systems. A vehicle may include a DC/DC converter module 128 that converts the high voltage DC output of the traction battery 124 to a low voltage DC supply that is compatible with other low-voltage vehicle loads. An output of the DC/DC converter module 128 may be electrically coupled to an auxiliary battery 130 (e.g., 12V battery).

The vehicle 112 may be a battery electric vehicle (BEV) or a plug-in hybrid electric vehicle (PHEV) in which the traction battery 124 may be recharged by an external power source 136. The external power source 136 may be a connection to an electrical outlet. The external power source 136 may be an electrical power distribution network or grid as provided by an electric utility company. The external power source 136 may be electrically coupled to electric vehicle supply equipment (EVSE) 138. The EVSE 138 may provide circuitry and controls to control and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be any type of port configured to transfer power from the EVSE 138 to the vehicle 112. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 112. The EVSE connector 140 may have pins that mate with corresponding recesses of the charge port 134. Alternatively, various components described as being electrically coupled may transfer power using a wireless inductive coupling.

One or more electrical loads 146 may be coupled to the high-voltage bus. The electrical loads 146 may have an associated controller that operates and controls the electrical loads 146 when appropriate. Examples of electrical loads 146 may be a heating module, an air-conditioning module, or the like.

The various components discussed may have one or more associated controllers to control and monitor the operation of the components. The controllers may communicate via a serial bus (e.g., Controller Area Network (CAN)) or via discrete conductors. One or more system controllers 150 may be present to coordinate the operation of the various components. It is noted that the system controller 150 is used as a general term and may include one or more controller devices configured to perform various operations in the present disclosure. For instance, the system controller 150 may include a powertrain control module (PCM) configured to enable powertrain controls of the vehicle 112. The PCM may be further configured to supply electric power to the powertrain by connecting and disconnecting the traction battery 124 from one or more powertrain components. The system controller 150 may further include a telematics control unit (TCU) configured to enable a telecommunication function with various entities (e.g. a server) via a wireless network (e.g. a cellular network).

The system controller 150 and/or BECM 125, individually or combined, may be programmed to perform various operations with regard to the traction battery 124. For instance, the system controller 150 and/or BECM 125 may be configured to energize/deenergize a HV bus of the vehicle 11 by connecting/disconnecting the traction battery 124 from the rest of the vehicle 112 via the one or more main contactors 127 during various stages of the vehicle assembly process.

Figure 2:
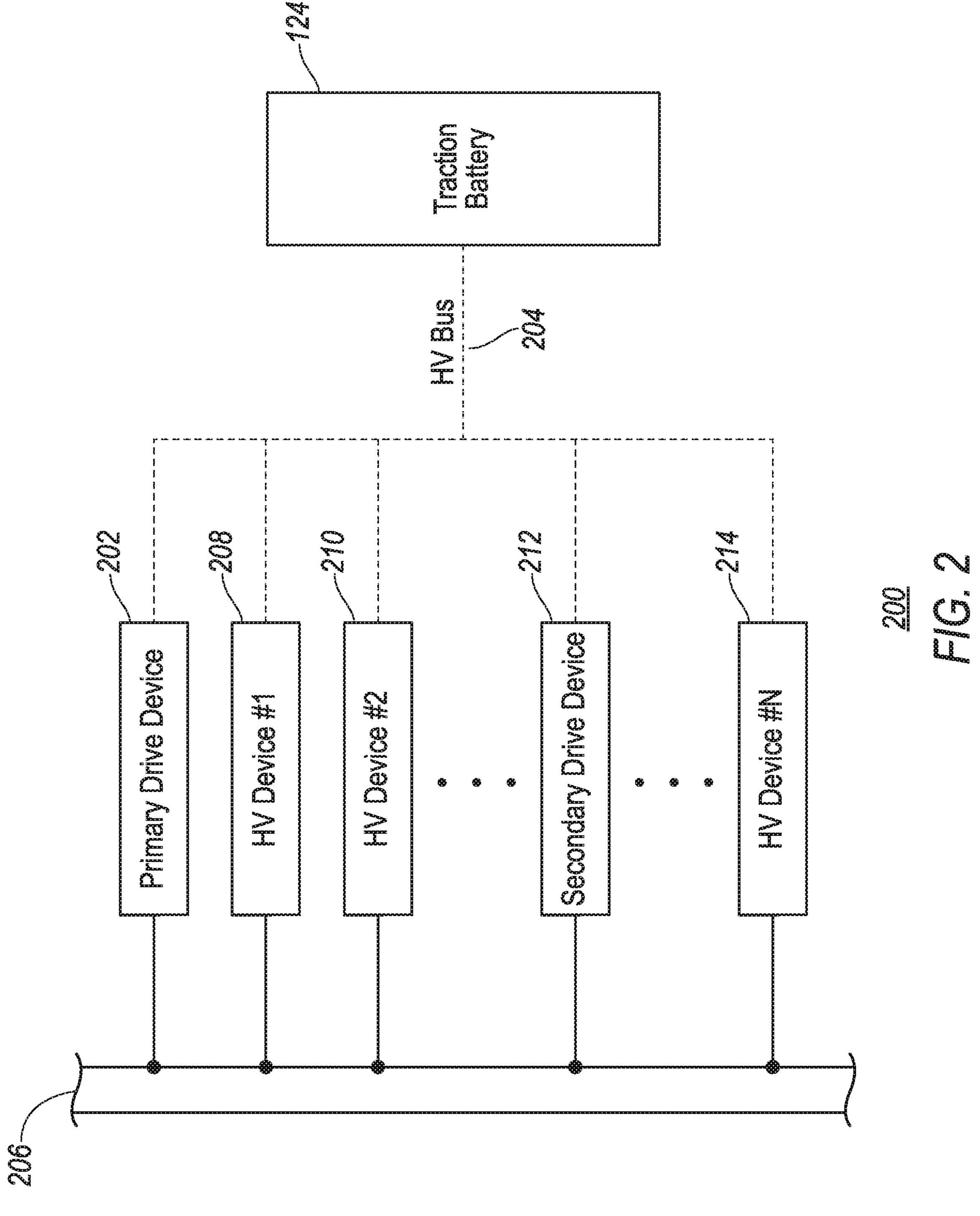
FIG. 2 illustrates an example block diagram of the vehicle during a vehicle assembly process.

Referring to FIG. 2, a system block diagram 200 during a vehicle assembly process is illustrated. For instance, the vehicle 112 may be provided with a primary drive device 202 to control the energization and de-energization of a HV bus 204. The HV bus 204 may include one or more cables/harnesses configured to conduct HV electric power between various components of the vehicle 112 such as the traction battery 124, power conversion module 132, electric load 146 or the like. The primary drive device 202 may be implemented via various components of the vehicle 112. With continuing reference to FIG. 1, the primary drive device 202 may be individually or collectively implemented via one or more of the system controllers (e.g. PCM) 150, and/or BECM 125. During various stages of the assembly process, the primary drive device 202 may be configured to communicate with various components of the vehicle 112 via an in-vehicle network 206. The in-vehicle network 206 may include, but is not limited to, one or more of a controller area network (CAN), an Ethernet network, and a media-oriented system transport (MOST), as some examples. Furthermore, the in-vehicle network 206, or portions of the in-vehicle network 206, may be a wireless network accomplished via Bluetooth low-energy (BLE), Wi-Fi, UWB, or the like.

The primary drive device 202 may be configured to energize and deenergize the HV bus 204 based on signal communications with one or more components via the in-vehicle network 206. The primary drive device 202 and the traction battery 124 may be connected to the HV bus 204 at one or more early stages of the vehicle assembly process. During various stages of the assembly process, various components are installed onto the vehicle 112 in a predefined order/sequence. For instance, after the primary drive device 202 is installed and activated, a first HV device 208 may be installed and connected to both the HV bus 204 and the in-vehicle network 206. At a further later stage, a second HV device 210 may be subsequently installed. More components (not shown) may be installed at subsequent stages of the assembly process. The primary device 202 may be configured to operate the HV bus 204 based on the presence and absence of each component at the corresponding stage. The HV bus 204 may be energized in default during the process to provide electric power to HV devices. However, if the primary drive device 202 detects a presence or absence of an HV device that does not correspond to the current assembly stage indicative of an assembly error, the primary drive device 202 may deenergize the HV bus 204 by opening the main contactor 127 to suspend the assembly process, until the current issue has been addressed. Additionally or alternatively, the primary drive device 202 may deenergize the HV bus 204 responsive to detecting a mismatch between the signal from the HV bus and a signal from the in-vehicle network 206 indicative of an error. For instance, if the primary drive device 202 detects a signal communication for the first HV device 208 but does not detect the current draw from the first HV device 208, or detects the current draw from the first HV device 208 but does not communicate with the first HV device 208, the main contactor 127 may be open until the potential issue is addressed. The primary drive device 202 may reenergize the HV bus 204 once the error is cleared.

In an alternative example, more than one drive device may be provided to the vehicle 112 during the assembly process. As illustrated with reference to FIG. 2, a secondary drive device 212 may be connected to both the HV bus 204 and the in-vehicle network 206 and configured to operate the HV bus 204 based on the connection status of one or more components. For instance, the secondary drive device 212 may exclusively or collectively with the primary drive device 202 monitor the connection status of an Nth HV device 214 corresponding to a predefined stage of the assembly process. The secondary drive device 212 may be installed at a stage subsequent to the stage at which the primary drive device 202 is installed. The secondary drive device 212 may be installed at a stage subsequent to the stage at which the first and second HV devices 208, 210 are installed and therefore does not monitor the connection status of the first and second HV devices 208, 210.

Figure 3:
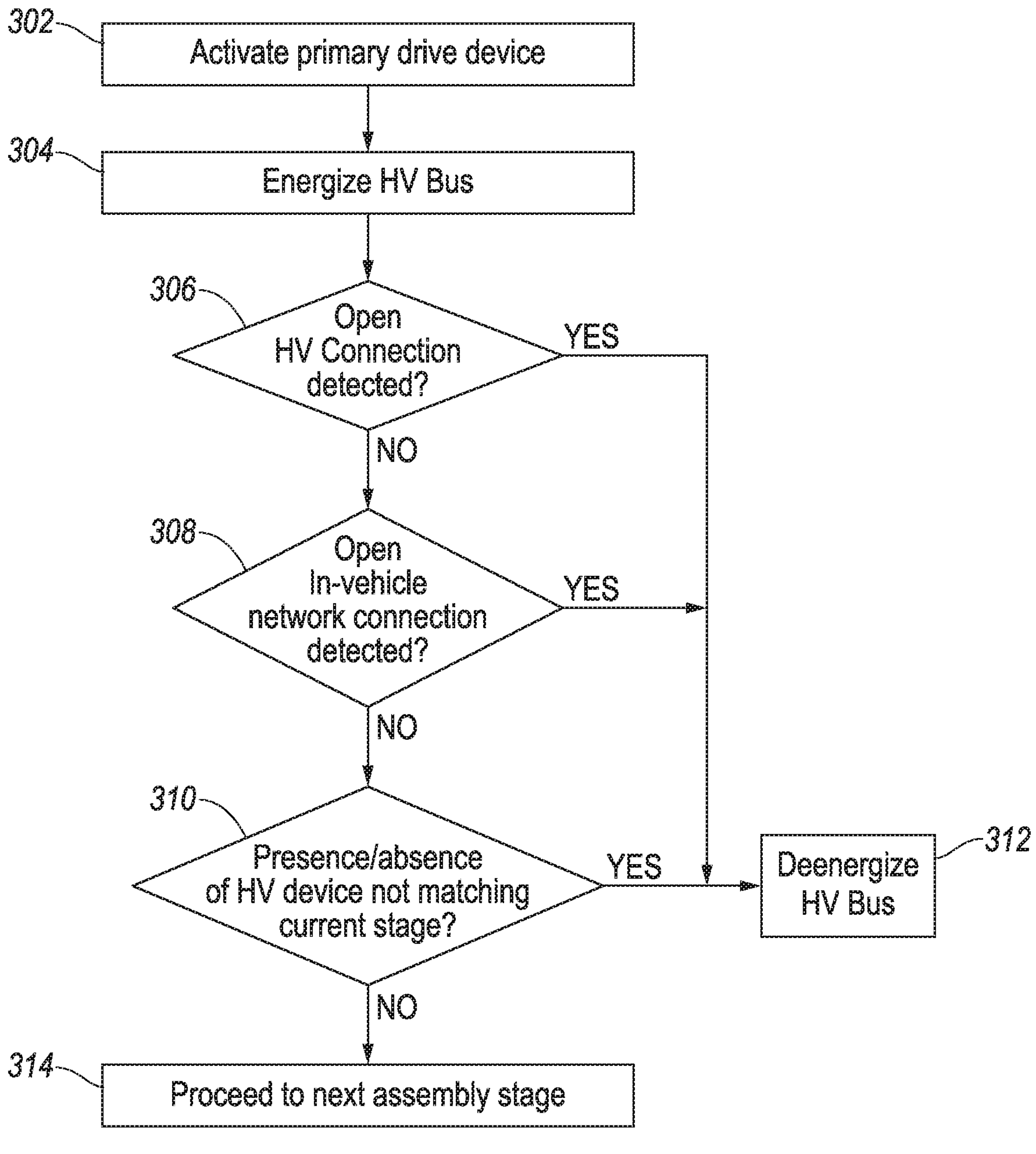
FIG. 3 illustrates an example flow diagram of a process for controlling the HV system of the vehicle.

Referring to FIG. 3, an example flow diagram of a process 300 for controlling the HV power system of a vehicle during an assembly process is illustrated. With continuing reference to FIGS. 1 and 2, the process 300 may be implemented via one or more of the primary drive device 202 and/or the secondary drive device 212. In other words, the process 300 may be implemented via one or more of the system controllers 150 and BECM 125 of the vehicle 112. For simplicity, the following description will be made with reference to the primary drive device 202. At operation 302, the primary drive device 202 is activated after being installed and connected to both the HV bus 204 and the in-vehicle network 206. The primary drive device 202 starts to monitor signals and connections of both the HV bus 204 and the in-vehicle network 206. At operation 304, the HV bus 204 is energized by closing the main contactor 127 connecting the HV bus 204 with the traction battery 124. It is noted that the HV bus 204 may be energized before or after the activation of the primary drive device 202.

At operation 306, the primary drive device 202 verifies if an open connection is detected on the HV bus 204 indicative of a missing component. There are various methods to detect the open connections on the HV bus 204. For instance, the primary drive device 202 may detect the open connection by sensing a voltage and/or current variation on the HV bus 204 indicative of a connection/disconnection of a power device. If the answer for operation 306 is a yes, the process proceeds to operation 312 and the primary drive device 202 deenergizes the HV bus and flags an alarm to notify a technician for further inspection. Otherwise, if the answer for operation 306 is a no, the process proceeds to operation 308 and the primary drive device 202 verifies if an open connection on the in-vehicle network 206 is detected. Similarly, there are a variety of methods to detect an open connection on the in-vehicle network 206. For instance, the primary drive device 202 may detect an open connection based on signal communications with each HV device via the in-vehicle network 206. Responsive to detecting a loss of communication with one or more HV devices, the process proceeds to operation 312 to deenergize the HV bus 204. At operation 310, the primary drive device 202 verifies if the presence or absence of any of the HV devices does not correspond to the current stage of the assembly process. As discussed above, the vehicle assembly process may be divided into multiple stages and the HV devices may be installed onto the vehicle 112 at different stages in a predefined order known to the primary drive device 202. Responsive to detecting that a presence or absence of any of the HV devices does not correspond to the current stage indicative of an assembly error, the process proceeds to operation 312. Otherwise, the process proceeds to operation 314 to move on to the next assembly stage and continue to monitor the assembly process. It is noted that the process 300 may be applied to the vehicle during assembly process and may not be applied to the vehicle during vehicle operation after the assembly process has complete. For instance, during vehicle operation, if a loss of communication between the primary drive device and one or more of the HV devices is detected, the vehicle may continue to operate without disconnecting the traction battery 124 from the HV bus 204.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:

an in-vehicle communication network;

a high-voltage (HV) bus;

a traction battery;

a control system including a plurality of HV devices; and a controller programmed to, during installation of the control system, responsive to detecting presence of one of the HV devices via one of the in-vehicle communication network or the HV bus, and detecting absence of the one of the HV devices via the other of the in-vehicle communication network or the HV bus, disconnect the traction battery from the HV bus, and during operation of the vehicle, responsive to detecting presence of the one of the HV devices via one of the in-vehicle communication network or the HV bus, and detecting absence of the one of the HV devices via the other of the in-vehicle communication network or the HV bus, not disconnect the traction battery from the HV bus.

2. The vehicle of claim 1, wherein the controller is further programmed to maintain an installation order of the control system such that the one of the HV devices is installed before an other of the HV devices, and responsive to detecting presence of the other of the HV devices and absence of the one of the HV devices, disconnect the traction battery from the HV bus.

3. The vehicle of claim 1, wherein installation of the control system is divided into multiple stages in which the one of the HV devices is installed during a first of the stages and an other of the HV devices is installed during a second of the stages, and wherein the controller is further programmed to, responsive to detecting presence of the other of the HV devices during the first of the stages, disconnect the traction battery from the HV bus.

4. The vehicle of claim 1 further comprising a secondary controller programmed to operate collectively with the controller to, during installation of the control system, responsive to detecting a same presence of one of the HV devices via one of the in-vehicle communication network or the HV bus, and detecting a same absence of the one of the HV devices via the other of the in-vehicle communication network or the HV bus, collectively disconnect the traction battery from the HV bus with the controller.

5. The vehicle of claim 4, wherein the secondary controller is further programmed to, during installation of the control system, responsive to detecting presence of an other of the HV devices via one of the in-vehicle communication network or the HV bus, and detecting absence of the other of the HV devices via the other of the in-vehicle communication network or the HV bus, individually disconnect the traction battery from the HV bus regardless of operation of the controller.

6. The vehicle of claim 1, wherein the traction battery is selectively connected to the HV bus.

7. A method for controlling a vehicle during an assembly process having multiple stages in which a first high-voltage (HV) device is installed during a first of the stages and a second HV device is installed during a second of the stages after the first of the stages, comprising:

responsive to detecting, via a controller, a traction battery has been installed, connecting via a contactor the traction battery to a high-voltage (HV) bus; and responsive to detecting, via the controller, presence of the second HV device during the first of the stages, disconnect the traction battery from the HV bus.

8. The method of claim 7, further comprising:

responsive to detecting, via the controller, presence of the first HV device via one of an in-vehicle communication network or the HV bus, and detecting absence of the one of the HV devices via the other of the in-vehicle communication network or the HV bus, disconnecting the traction battery from the HV bus.

9. The method of claim 7, further comprising:

responsive to detecting, via both the controller and a secondary controller, presence of the second HV device during the first of the stages, disconnect the traction battery from the HV bus.

10. The method of claim 7, further comprising:

responsive to detecting, via the controller, presence of the second HV device and absence of the first HV device during the first of the stages, disconnect the traction battery from the HV bus.

11. The method of claim 10, further comprising:

responsive to detecting, via both the controller and a secondary controller, presence of the second HV device and absence of the first HV device during the first of the stages, disconnect the traction battery from the HV bus.

12. A vehicle comprising:

a high-voltage (HV) bus; and a controller programmed to, during assembly of a control system including a plurality of HV devices to be installed in a predefined order such that one of the HV devices is installed before an other of the HV devices, and responsive to detecting presence of the other of the HV devices and absence of the one of the HV devices, disconnect a traction battery from the HV bus.

13. The vehicle of claim 12, further comprising:

an in-vehicle communication network, wherein the controller is further programmed to, during assembly of a control system, responsive to detecting presence of the one of the HV devices via one of the in-vehicle communication network or the HV bus, and detecting absence of the one of the HV devices via the other of the in-vehicle communication network or the HV bus, disconnect the traction battery from the HV bus.

14. The vehicle of claim 13, wherein the controller is further programmed to, during operation of the vehicle, responsive to detecting presence of the one of the HV devices via one of the in-vehicle communication network or the HV bus, and detecting absence of the one of the HV devices via the other of the in-vehicle communication network or the HV bus, not disconnect the traction battery from the HV bus.

15. The vehicle of claim 13, further comprising:

a secondary controller programmed to operate collectively with the controller to, during assembly of the control system, responsive to detecting a same presence of the one of the HV devices via one of the in-vehicle communication network or the HV bus, and detecting a same absence of the one of the HV devices via the other of the in-vehicle communication network or the HV bus, collectively disconnect the traction battery from the HV bus with the controller.

16. The vehicle of claim 12, wherein the traction battery is selectively connected to the HV bus.

* * * * *